C. M. SWANSON.
PULLEY.
APPLICATION FILED JAN. 17, 1908.
905,019.
Patented Nov. 24, 1908.
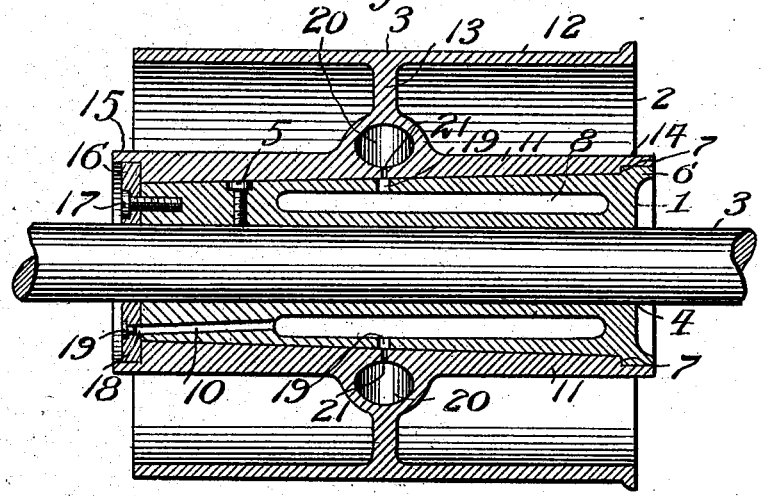
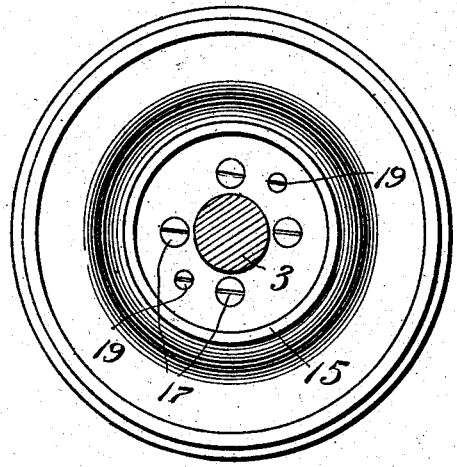
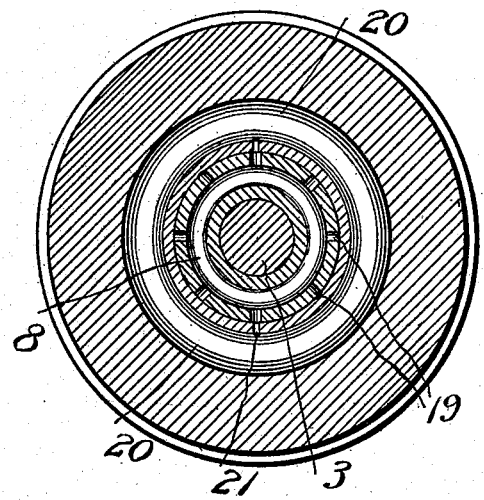
Witnesses
Hugh H. Ott
K. Allen
Inventor
Carl M. Swanson
By Victor J. Evans
Attorney

UNITED STATES PATENT OFFICE.

CARL M. SWANSON, OF DES MOINES, IOWA.

PULLEY.

No. 905,019.        Specification of Letters Patent.        Patented Nov. 24, 1908.

Application filed January 17, 1908. Serial No. 411,358.

*To all whom it may concern:*

Be it known that I, CARL M. SWANSON, a citizen of the United States, residing at Des Moines, in the county of Polk and State of Iowa, have invented new and useful Improvements in Pulleys, of which the following is a specification.

The invention relates to an improvement in pulleys, and is particularly directed to a loose pulley in the construction of which provision is made for a continual and automatic lubrication of the pulley for an extended period.

The main object of the present invention is the provision of a loose pulley made up of two sections, one of which is fixed with relation to the shaft and the other movable with relation thereto, each of said sections being formed with lubricant receiving chambers, one of which is formed in the relatively fixed section and the other in the movable section, the former being adapted for semi-solid lubricants while the latter is adapted for fluid lubricants.

The invention in the preferred form of details will be described in the following specification, reference being had to the accompanying drawings in which:

Figure 1 is a longitudinal central sectional view through my improved pulley, the shaft being shown in elevation. Fig. 2 is an end elevation of the pulley with the shaft in section. Fig. 3 is a transverse section of the pulley on the line 3—3 of Fig. 1.

Referring particularly to the accompanying drawings my improved pulley is made up of two sections 1 and 2, the former of which is adapted to be fixed with relation to the shaft 3 on which the pulley is mounted, and may be hereinafter termed the fixed section, while the latter is loosely mounted on section 1 and will be hereinafter termed the loose or belt section.

The fixed section is in the form of an elongated sleeve-like member formed with a central bore 4 for the reception of the shaft 3, a set screw 5 passing through the wall of the sleeve and engaging the shaft to fix the section 1 with relation to the shaft. The peripheral surface of the section 1 tapers from one end toward the other, being formed at the larger end with an annular off-set 6 forming an abrupt shoulder 7. Within the section 1 is formed an annular lubricant chamber 8, preferably of elongated shape and arranged wholly within the body of the section between its peripheral surface and the bore 4. This chamber is in communication with the peripheral surface of the section by a series of radially disposed openings 9, so that lubricant in the chamber 8 may find its way to the peripheral or bearing surface of the section. The chamber 8 which terminates at one end remote from the end of the section is in communication with said end through the medium of channels 10, through which the lubricant may be forced into the chamber.

The belt section is mainly in the form of an ordinary pulley comprising a hub 11 and a belt receiving sleeve or surface 12, the hub and sleeve 12 being connected by an annular centrally disposed web 13. The interior surface of the hub 11 corresponds in taper and diameter to the exterior dimensions of the section 1, said hub being cut away at one end as at 14 to engage the shoulder 7 and the annular off set 6. At the opposite end the hub which is extended beyond the proximate end of the section 1 is formed with an annular recess 15 designed to receive a screw disk 16, the inner surface of which is designed to bear squarely against the proximate end of the section 1 and to be removably secured thereto through the medium of screws 17, whereby the belt section and fixed section are held against relatively longitudinal movement while being permitted free independent revoluble movement. The lubricant channels 10 in the fixed section are accessible from the end of the pulley through communicating apertures 18 formed in the disk 16, and registering with channels 10 when the disk is in applied position, filling screws 19 normally closing these entrance openings.

Adjacent the hub 11 the web 13 is materially thickened and formed in said thickened portion with an annular chamber 20, forming a lubricant chamber which is in communication with the interior surface of the belt section through the medium of apertures 21, in which is preferably mounted a series of wicks or other capillary distributers.

In the use of the pulley with a comparatively solid lubricant as grease, the chamber 8 in the fixed section 1 is charged with such lubricant through the channels 10, while in the use of a fluid lubricant as oil the chamber 20 in the belt section is used. In the latter event the chamber 8 in the fixed section is closely packed with an absorbent as waste and the like, preventing the lubricant from finding its way freely into the channel and yet permitting the waste to receive and absorb sufficient of said lubricant to assist in the lubrication of the parts.

It is to be particularly noted that the hub of the pulley extends a slight distance beyond the proximate edge of the fixed section. By this construction the oil and grease finding its way between the sections is prevented from coming in contact with or dripping upon the belt. By virtue of the taper of section 1 the hub of the pulley will not wear in the shifting operation of the belt from the tight pulley to the loose pulley, as such operation tends to force the belt section or section 2 of the loose pulley on to the comparatively larger portion of the fixed section or sleeve 1, thereby taking up all lost motion between the respective sections at the particular time when the moving section is subjected to extreme strain.

The pulley described is of comparatively simple construction, the parts being so arranged as to permit their ready disconnection when desired for repair or renewal, and the use of the combined oil chambers permitting an extended and appropriate operation of the parts with a single lubrication.

Having thus described the invention what I claim is:—

1. A pulley made up in two sections, a fixed section to be secured to the shaft and a belt section to revolve upon the fixed section, the bearing surfaces of the respective sections tapering from one end to the other, the fixed section comprising a solid body encircling the shaft, said body being formed with an elongated chamber arranged wholly within the body of the section and communicating with a channel formed in an opening through one end of the body of the section, the belt section being formed with an annular chamber disposed around the chamber in the fixed section, and means for establishing communication between the elongated chamber and annular chamber.

2. A pulley made up in two sections, a fixed section to be secured to the shaft and a belt section to revolve upon the fixed section, the bearing surfaces of the respective sections tapering from one end to the other, the fixed section comprising a solid body encircling the shaft, said body being formed with an enlarged chamber arranged wholly within the body of the section and communicating with a channel formed in an opening through one end of the body of the section, the belt section being formed with an annular chamber disposed around the chamber in the fixed section, means for establishing communication between the respective chambers, and a disk adapted to be secured to the fixed section and engage the belt section to prevent independent longitudinal movement of the latter, said disk being formed with an opening to register with the channel in the fixed section.

In testimony whereof I affix my signature in presence of two witnesses.

CARL M. SWANSON.

Witnesses:
T. J. CASSELL,
A. B. SIMS.